2,803,584
ZINC BACITRACIN-CONTAINING TROCHE

Edward B. Hodge and Grant J. Lafferty, Terre Haute, Ind., assignors to Commercial Solvents Corporation, Terre Haute, Ind., a corporation of Maryland No Drawing. Application December 16, 1953, Serial No. 398,630

7 Claims. (Cl. 167—65)

Our invention relates to a therapeutic bacitracin preparation and more particularly to zinc bacitracin preparations for oral use.

The well-known antibiotic, bacitracin, has been found particularly useful for the treatment of various disorders of the oral cavity including the mouth and throat, since such disorders are frequently caused by bacitracin-susceptible organisms. In order to treat such afflictions effectively, bacitracin is generally administered in the form of a tablet or troche which, when placed in the oral cavity, will dissolve slowly, thus releasing therapeutic concentrations of the antibiotic for extended periods of time. Bacitracin is well-known to have a very bitter taste which detracts considerably from the pharmaceutical elegance of tablets or troches which are employed in the oral cavity. Many attempts have been made to alleviate this distracting property of bacitracin and such attempts have included incorporation in the tablets and troches of a flavoring agent designed to mask the bitter taste of bacitracin, or of a mild anesthetic such as benzocaine which acts to deaden the taste buds and to relieve the discomfort of irritated mouth and throat membranes as well as the cough reflex brought about by a tickling sensation. So far, attempts to mask the taste of bacitracin have been unsuccessful, while the mild anesthetic included to deaden the taste buds, requires time to act and hence does not prevent the bitter taste initially experienced upon introduction of the bacitracin into the oral cavity.

We have now discovered a new therapeutic bacitracin preparation suitable for use in the oral cavity which does not have an objectionable taste and which is economical, effective, and relatively easy to produce.

Our new therapeutic composition consists of a solid, edible matrix containing as the essential active ingredient the compound zinc bacitracin. The compound zinc bacitracin is described along with a process for producing it in copending application Serial No. 398,629 filed Dec. 16, 1953. The compound zinc bacitracin is relatively tasteless when compared with ordinary bacitracin, and what taste zinc bacitracin does have, we are able to mask satisfactorily when incorporating it in a tablet for use in the oral cavity. The relative tastelessness of zinc bacitracin and its suitability for use in the oral cavity were unexpected in view of experience with other metal salts of bacitracin. For example, the chromium, manganese, iron, cobalt, nickel, and copper salts of bacitracin are extremely amorphous, highly colored, and in some cases extremely toxic to human beings. The aluminum salt of bacitracin has been made and, being relatively insoluble, would appear to be a satisfactory bacitracin material for use in the oral cavity, however, the aluminum salt has a very bitter taste, which, like ordinary bacitracin, cannot be masked by usual means.

Our new therapeutic bacitracin composition can be employed in any convenient form known and employed by the pharmaceutical trade for therapeutic use in the oral cavity, however, we prefer to employ it in the form of a tablet which can be cast or compressed into any desired size and shape, including troches, lozenges, etc. In addition to the zinc bacitracin which is the therapeutic ingredient of our new preparation, we can include the usual dispersing agents, binding and granulating agents, flavoring agents, coloring agents, lubricants, etc. which are well known to those skilled in the art of pharmaceutical compounding. As dispersing agents in the soluble, edible matrix which we employ in our new therapeutic preparation, we can include such materials as lactose, sucrose, starch, powdered sugar, beta lactose, etc. As binding and granulating agents, we can employ corn syrup, alcohol, zein, water, starch paste, gelatin, algin, sodium alginate, Veegum (a complex colloidal magnesium aluminum silicate produced by R. T. Vanderbilt Co., New York, New York), etc. Lubricants which we can employ in our new therapeutic preparation includes magnesium stearate, talc, stearic acid, amino acids, Sterotex (hydrogenated vegetable oil produced by Capital City Products Company, Columbus, Ohio), etc. If desired, various flavoring ingredients may be incorporated in the product to enhance palatability and as such flavoring agents, we can employ, for example, cocoa, citric acid, vanilla, imitation vanilla, sucrose, saccharin, Sucaryl, oil of wintergreen, mint, etc. as well as flavoring agents which in themselves possess therapeutic utility such as, for example, menthol, etc. Coloring agents can also be employed in our new therapeutic preparation and specifically, we can employ cocoa, as well as approved Food and Drug Administration colors.

The amount of zinc bacitracin which we employ in our new therapeutic preparation is not particularly critical, though we prefer to employ an amount such that a prolonged therapeutic effect is obtained following introduction of our new preparation into the oral cavity. We have found a suitable amount of bacitracin for inclusion in our therapeutic preparation to be 1,000 units of bacitracin per tablet.

A particularly acceptable zinc bacitracin troche has the following formula (percentages are by weight): Zinc bacitracin—1,000 units per troche, powdered acacia—3.3%, powdered citric acid—0.27%, powdered saccharin—0.11%, powdered sugar—ca 85%, vanilla flavoring—1%, gelatin—0.625%, powdered Veegum—1.0%, magnesium stearate—1.0%, Sterotex—1.0%.

The following example is offered to illustrate our invention, however, we do not intend to be limited to the specific amounts, materials, or procedures recited therein.

EXAMPLE I

A 12 gram portion of zinc bacitracin assaying 55 units per milligram was mixed thoroughly with 420 g. of powdered saccharin sodium. This mixture was then granulated with 6.0 ml. of vanilla flavoring and 150 ml. of a warm 25% gelatin solution. The granulated mass was then screened moist through a 16-mesh screen, dried at not over 37° C., rescreened through a 16-mesh screen and then blended with 4.6 g. powdered Veegum, 4.6 g. magnesium stearate, and 4.6 g. Sterotex. From this final mixture 450 troches, weighing 800 mg. each, were punched out using a ½ inch bevel punch. The final product assayed 992 units of bacitracin per troche.

Saliva studies have been conducted with our new zinc bacitracin therapeutic preparation to determine the bacitracin saliva level which is obtained following the use of zinc bacitracin troches in the oral cavity. In these studies, each of eleven patients was given a zinc bacitracin troche having the composition given in the above example with instructions to place the troche between the cheek and the gum for the test. A saliva sample was taken from each subject at intervals of 15, 30, 60, 90, and 120 minutes following administration of the troche. No food or drink of any kind was consumed during the course of the test period. The mean disintegration time and saliva levels are given in the following table.

*Table I*

MEAN BACITRACIN SALIVA LEVELS—ELEVEN SUBJECTS ZINC BACITRACIN TROCHE
[1,000 units bacitracin per troche]

| Disintegration Time—Min. | Bacitracin Levels, Units/ml. Saliva | | | | |
|---|---|---|---|---|---|
| | 15 Min. | 30 Min. | 60 Min. | 90 Min. | 120 Min. |
| 38.4 | 23.7 | 11.5 | 1.85 | 0.38 | 0.18 |

It will be understood that we intend to include within the scope of our invention as described in this specification and the attached claims all modifications and equivalents obvious to those skilled in the art.

What we claim is:

1. A therapeutic composition for the treatment of afflictions of the oral cavity comprising a solid, edible matrix containing the zinc salt of bacitracin.

2. A therapeutic composition for use in the oral cavity comprising a solid, edible matrix containing the zinc salt of bacitracin dispersed throughout its mass.

3. A non-bitter tasting therapeutic bacitracin preparation for use in the oral cavity which comprises a solid, edible matrix containing the zinc salt of a bacitracin and a flavoring agent.

4. The composition of claim 3 wherein the flavoring agent is cocoa.

5. The composition of claim 3 wherein the flavoring agent is a sugar substance.

6. The composition of claim 3 wherein the flavoring agent is a vanilla tasting substance selected from the group consisting of vanilla and imitation vanilla.

7. The composition of claim 3 wherein the flavoring agent is citric acid.

References Cited in the file of this patent

UNITED STATES PATENTS

| 2,544,630 | Hegarty | Mar. 6, 1951 |
| 2,653,900 | Holland | Sept. 29, 1953 |
| 2,676,134 | Felsenfeld | Apr. 20, 1954 |

OTHER REFERENCES

Fed. Register, November 21, 1953, pages 7382–7384.

Anker et al.: "Bacitracin . . .," J. Bacteriology, February 1948, pages 249–255, especially at page 254.

Johnson et al.: "Research in Antibiotics, A Symposium at Washington, D. C., January 31–February 1, 1947, 6pp.